United States Patent [19]

Faber, Jr.

[11] Patent Number: 4,989,459
[45] Date of Patent: Feb. 5, 1991

[54] TORQUE TESTING APPARATUS

[75] Inventor: Nicholas J. Faber, Jr., Raleigh, N.C.

[73] Assignee: Bristol-Myers Squibb Company, New York, N.Y.

[21] Appl. No.: 448,476

[22] Filed: Dec. 11, 1989

[51] Int. Cl.$^5$ .............................................. G01L 5/00
[52] U.S. Cl. ................................. 73/862.23; 73/847
[58] Field of Search ................ 73/847, 862.19, 862.21, 73/862.23

[56] References Cited

U.S. PATENT DOCUMENTS

| 3,866,463 | 2/1975 | Smith et al. | 73/847 X |
| 4,674,340 | 6/1987 | Burt et al. | 73/847 X |
| 4,716,772 | 1/1988 | Bubeck et al. | 73/847 X |

FOREIGN PATENT DOCUMENTS 0129717 10/1980 Japan .................................. 73/862.21

Primary Examiner—Charles A. Ruehl
Attorney, Agent, or Firm—Gene Warzecha

[57] ABSTRACT

A torque testing apparatus for use with threaded closures, the apparatus enabling the use of a manually operated torque tester, such as the industry standard Owens-Illinois torque meter, while simultaneously eliminating many of the variables normally inherent in any determination of application or removal torque by the human operator. The apparatus incorporates a standard torque meter to hold a container having a threaded closure to be tested and includes a closure rotating motor, the output shaft of which rotates at a substantially constant speed and is parallel to and in line from the axis of the closure. A closure-holding lever arm is secured to the closure and a motor lever arm is secured to the motor. An abutment pin is secured to the latter at a fixed distance from the output shaft of the motor and is adapted to be slidably contiguous to the closure-holding lever arm in such a way that the torsional force of the constant speed motor is applied to the closure with a gradually increasing angular velocity in a manner simulating a human operator.

7 Claims, 2 Drawing Sheets

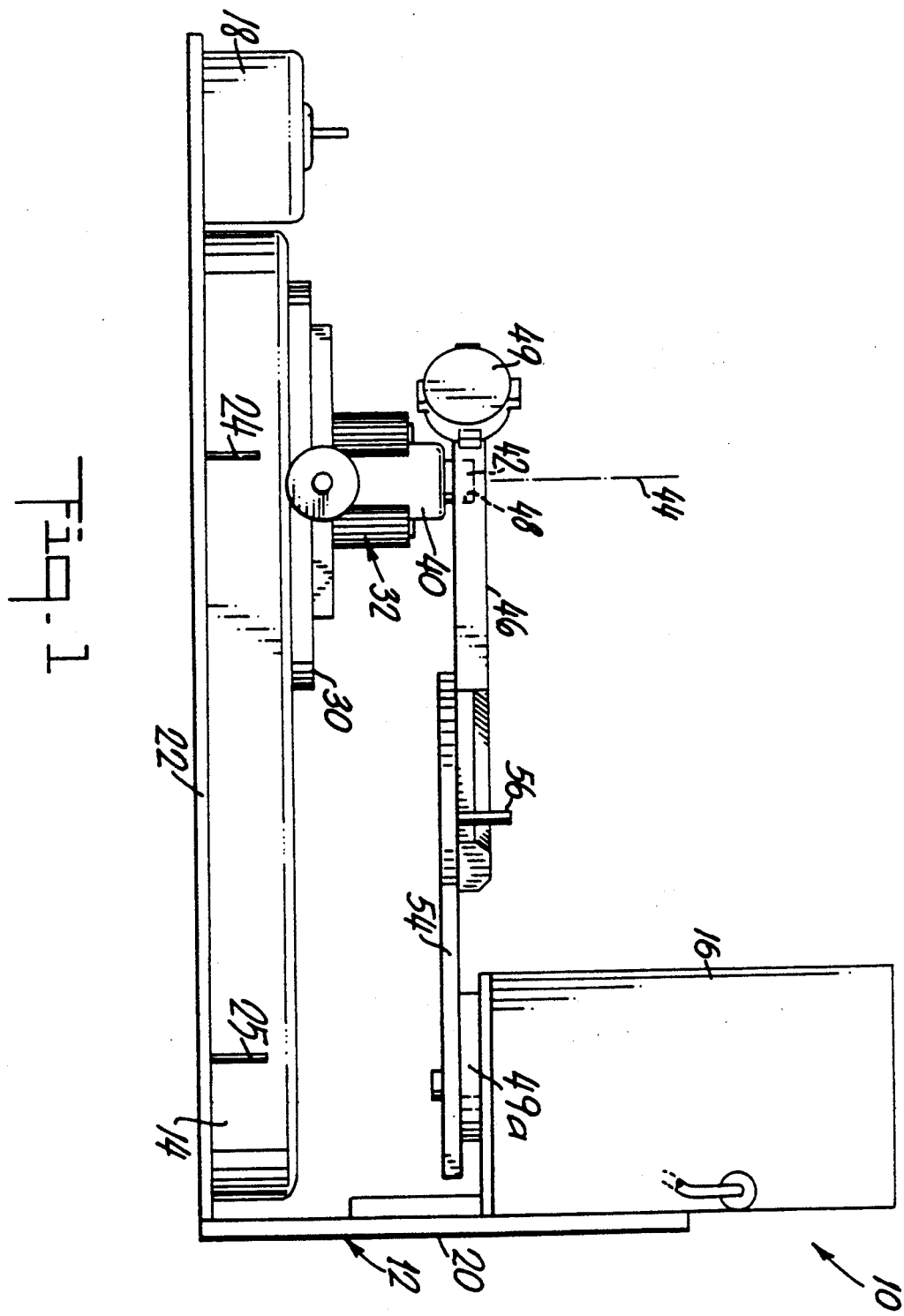

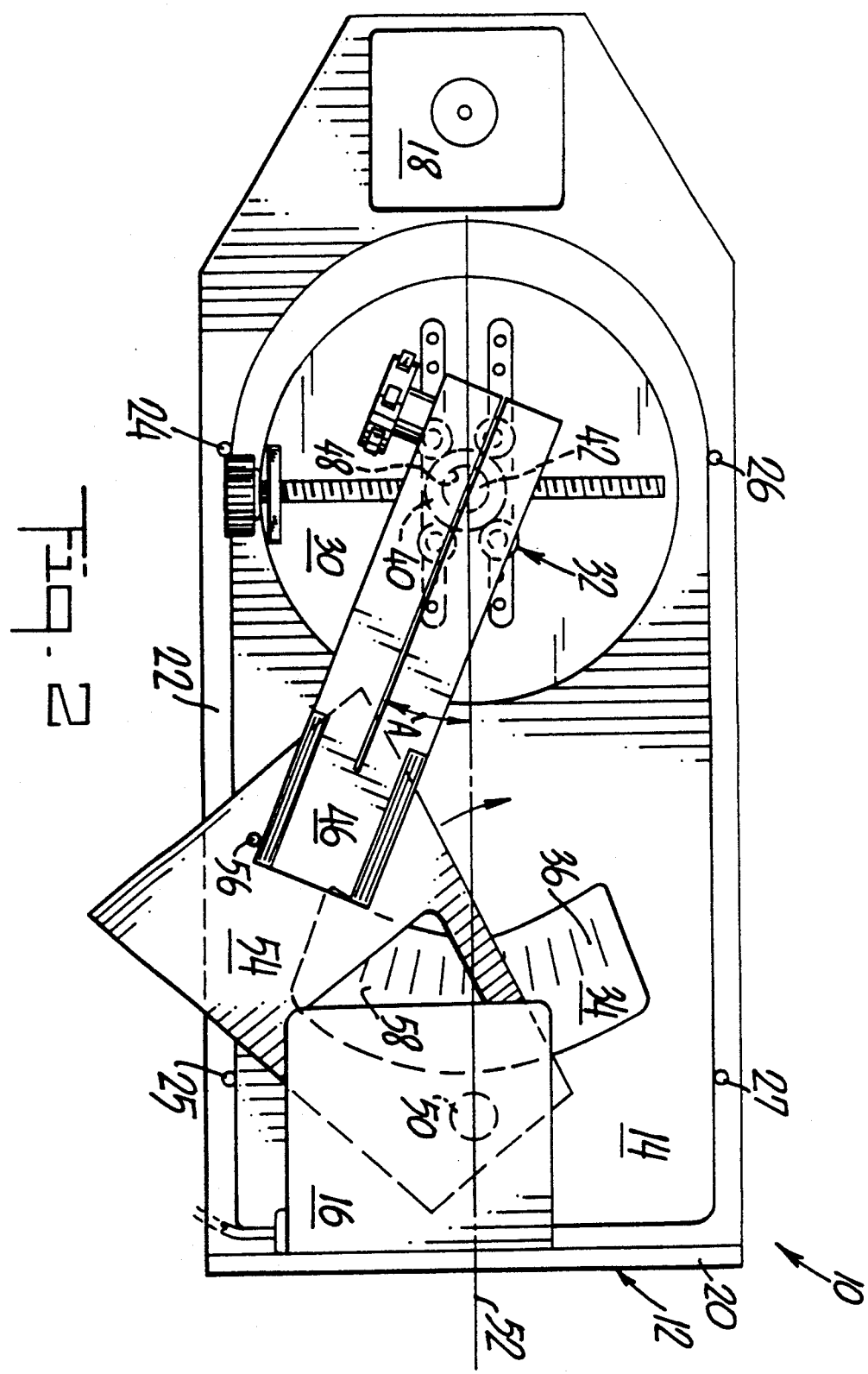

TORQUE TESTING APPARATUS

BACKGROUND OF THE INVENTION

1. Field of the Invention

This invention generally relates to testing apparatus for determining the degree to which an object being tested conforms to applicable standards. More particularly, the invention relates to an apparatus for determining the amount of torque required to remove or apply a screw-type closure cap from its associated threaded container.

2. Description of the Prior Art

In the manufacture of packages comprising combinations of screw-type closures with associated containers, it often becomes necessary or desirable to determine the degree to which the threaded or lug-type closure complies with torque specifications. As used herein, the term "threaded closures" also means "lug-type" closures or other "twist-type" closures. For example, the torque with which a threaded closure is applied must be of a certain magnitude in order to properly seal the container so the closure does not become loose during shipment. Additionally, in the packaging of pharmaceutical products, since they can be toxic in the wrong dosages, dosage requirements are somewhat critical and it is often either required or desirable to have a child-proof safety closure limiting access to the container contents. Such safety closures may, for example, comprise a threaded inner cap, for being threaded directly onto the neck of a container, and an overcap loosely rotatable relative to the inner cap. A user must push the overcap axially onto the inner cap to engage a ratchet mechanism to be able to simultaneously turn the inner cap.

During the manufacture of products packaged in containers having threaded closures, the caps may be applied with a capping machine which must be adjusted from time to time to overcome normal mechanical or component variations which may effect application torque. The normal procedure is for periodic quality control checks to be conducted on the packages being produced. During a particular production run, an operator may periodically remove a completed sample product to determine the degree of torque necessary to remove the threaded closure from the associated container. A change of removal torque falling outside an acceptable range indicates the capping machine or other component of the manufacturing process must be adjusted or replaced.

Several prior art devices and methods are known for effecting quality control torque tests of threaded closures to determine the amount of torque required to remove the cap. The standard in the industry is known as the Owens-Illinois Torque Meter which is now manufactured and marketed by Secure Pak, Inc., P.O. Box 14499 Toledo, Ohio 43614. The Owens-Illinois meter is a manual instrument essentially comprising a movable plate, the axis of which is attached via a spring loaded mechanism to a dial or digital meter. The movable plate has four adjustable posts to securely grip the container being tested. The American Society for Testing and Materials (ASTM) has issued an ASTM standard (D-3198-84) which describes the standard test method for determining application and removal torque of threaded or lug-style closures. This standard requires that the container be positioned between the four posts on the torque tester in such a manner that the axis of rotation of the cap is concentric with the center of the movable plate on which the container rests. The closure must then be gripped by hand, avoiding any contact with the container, and the closure must be twisted in the appropriate direction to either apply or remove the closure. The application or removal torque is read off the meter.

While the standard torque meter and test method are simple, there is one disadvantage associated with this prior art. The industry standard method has a built-in bias which is heavily dependent upon operator skill. Given any number of containers being tested, it has been found that any given operator testing for removal (or application or stripping) torque tends to produce a range of values for any particular product. If numerous operators are involved, as may be expected in a manufacturing facility, the torque readings become even more inconsistent and cover a wider range. Additionally, this range is even broader because of several human factors associated with this manual procedure: for example, holding the cap too low so that the operator's thumb touches the container; squeezing the cap too hard thereby making it out-of-round; squeezing too little; twisting with too much velocity or acceleration or little velocity or acceleration, etc. Even when a cap clamp is used, operator-introduced factors still affect the repeatability and consistency of torque values. The inability to obtain consistent readings over a narrow and repeatable range often leads quality control or production personnel to prematurely conclude that the capping mechanism (or other component) needs to be shut down to be either adjusted or repaired when, in fact, if accurate readings were available the manufacturing process could have continued unimpeded for a much longer time period. The unnecessary work stoppage and machine repair is obviously costly and inefficient. Generally, the component most often identified as needing adjustment or rebuilding is the clutch mechanism rotating the cap. It has been found that on production lines using threaded closures the clutch has had to be rebuilt or adjusted relatively frequently (on the order of ten hours or so) because of out-of-tolerance torque tests. Use of this invention has extended the time between clutch rebuilds on the order of 100 hours and more.

In addition to the necessity of using standard torque meters during the manufacturing process, it is also desirable to have a means for simulating the actual torque which a user may apply to a threaded closure when opening a product container. The manner in which a user applies torque to a threaded closure varies gradually from an initial value of zero to some finite value sufficient to open the cap. The normal tendency for a user is to grasp the container in one hand and the cap in the other and twist both in opposite directions. If a significant resistance is encountered, a user would tend to squeeze the cap and container harder while also twisting harder or faster until the cap is unscrewed.

There are known prior art devices which do not rely on the aforementioned manual standard torque meter and attempt to overcome operator-induced errors by using automated equipment. For example, U.S. Pat. No. 4,794,801 (Andrews et al.) discloses a bottle cap removal torque tester utilizing a rotatable motor for rotating a chuck engageable with the cap of a bottle and a torque sensor interposed between the motor and the bottle cap. The container, rotatable chuck, torque sensor and motor are all axially aligned and various other complex mechanical components are disclosed to provide an operable device. Another known device similar to the foregoing is the Auto-torque System manufactured by the Automated Dynamics Corporation, 105 Jordan Road, Renasselaer Tech Park, Troy, N.Y. 12180.

The Andrews et al. patent discloses an apparatus which eliminates the manual rotation of the cap (or cap clamp) and reduces the variation in cap rotational acceleration and velocity in tests conducted by different persons or by the same person at different times. The device provides for electrical rotation of the cap with repeatable control of rotational acceleration and velocity.

One disadvantage of both of the aforementioned devices is that they are costly, complex and, as with any complicated machine, proper operation of each device necessitates a large number of mechanical components operating properly together under satisfactory conditions. Each of these systems has several adjustable variable parameters (e.g. speed, height of chuck over cap, etc.) which could drift during the evaluation period. While such conditions might be found in an enclosed factory quality control area, operation of such devices is generally not suitable on the factory floor where many of the periodic torque checks are made. An additional disadvantage is that these devices are not operable with the industry standard manual torque meter called for in numerous ASTM standards. For example, the use of the industry standard Owens-Illinois Torque Meter is referenced in ASTM standards Nos. D3198-84; D3199-84; D3469-81; D3470-82; D3471-88; D3472-87; D3474-80 (calibration specification); and D3481-86. Use of any different torque sensor is not in compliance with these standards, thereby requiring manufacturers utilizing non-standard, automated torque testers to run duplicate torque tests on the standard (properly calibrated and certified) Owens-Illinois meter.

Furthermore, there already exists a standard procedure for calibrating the Owens-Illinois meter, making its use reliable and conforming to known standards. Procedures have not been standardized for use of any of the known non-standard automated torque testers. Consequently, torque data produced by these testers is most likely to be non-uniform and non-reliable in comparison to industry standards.

It is accordingly an object of this invention to provide an apparatus for determining the removal and/or application torque of a threaded closure on a container, the apparatus enabling the use of an industry standard manual torque meter while simultaneously eliminating many of the operator-induced errors associated with the use of such a manually operated meter.

It is another object of this invention to provide an apparatus for simulating a user's method of opening a threaded closure.

It is yet another object of this invention to provide a torque testing apparatus capable of utilizing the industry standard torque meter in such a way as to eliminate the operator-induced errors generally associated with the standard procedure for utilizing such a torque meter while simulating the manner in which a user may open such a threaded closure.

SUMMARY OF THE INVENTION

These and other objects of the invention are accomplished by the preferred embodiment disclosed herein which is a torque testing apparatus for determining the amount of torque required to move the threaded closure of a container, comprising: a torque meter having a mounting means operatively associated therewith for holding s id container; and torque applying means connected to said closure for applying to said closure a torque which gradually changes in magnitude until said closure is moved to a predetermined position relative to said container, thereby simulating movement of said closure by hand.

In one embodiment of the invention the torque applying means comprises a first lever arm secured at one end thereof to said closure, said first lever arm and said closure rotatable about a first axis; a second lever arm adapted to be moved relative to said first lever arm, said second lever arm oriented in a plane parallel to that of said first lever arm and rotatable about a second axis which is parallel to said first axis; motor means operatively connected to said second lever arm to rotate same about said second axis; an abutment means interposed between the free ends of said first and second lever arms, said abutment means being fixedly secured to one of said free ends and adapted to contiguously slide along the other of said free ends as said second lever arm is rotated about said second axis; and means to operate said motor means.

BRIEF DESCRIPTION OF THE DRAWINGS

FIG. 1 is a diagrammatic side elevation view of an apparatus constructed in accordance with the principles of this invention.

FIG. 2 is a top plan view of FIG. 1 showing the component parts of the apparatus at one point in time in the operating cycle of the device.

DESCRIPTION OF THE PREFERRED EMBODIMENT

As shown in FIGS. 1 and 2, the improved torque testing apparatus 10 comprises a frame 12 holding a standard Owens-Illinois Torque Meter 14, a cap rotating motor 16 and a power control means 18. Frame 12 has a vertical wall 20 supporting motor 16, and a horizontal platform 22 provided with a plurality of spaced pins 24, 25, 26 and 27 for holding torque meter 14. The pins enable the meter to be easily removed from the frame and moved about in the factory as necessary.

Torque meter 14 comprises a movable plate 30 to which an object being tested is secured via conventional clamping post means 32. Torque meter 14 also includes a window 34 through which a scale 36 of torque values is visible.

In the drawings, the object being tested is a container 40 having a threaded closure 42 which may or may not be a safety closure of the type having an inner cap and outer cap loosely rotatable relative thereto. For simplicity, the operation of the invention will be explained using the assumption that cap 42 is not a safety closure and is a simple, one-piece threaded cap. It will be understood by those skilled in the art that if a safety closure was being tested, a suitable weight or pressure arm (not shown) could be placed on the cap or the cap clamp lever arm to apply a predetermined downward axial force in order to engage the inner and outer caps of the safety closure.

Cap 42 is engaged by a conventional cap clamp lever arm 46 which engages cap 42 in an annular, split compression aperture 48 (tightened by knob 49) at one end of lever arm 46, the other end of the lever arm being adapted for use with other components as will be explained below.

Cap rotating motor 16 is mounted on vertical wall 20 in such a manner that the motor output shaft is connected to a gear reducing assembly 49a, the output shaft 50 of which is aligned with cap axis 44 along frame center line 52 (best seen in FIG. 2). Secured to output shaft 50 and perpendicularly extending therefrom is a motor lever arm 54 having an abutment pin 56 and a window 58 enabling the scale 36 of the torque meter to be visible therethrough. Window 58 is generally rectangular (although not fully shown) and is large enough to allow scale 36 to be visible throughout the arcuate range of motion of arm 54. While the arrangement of parts in the preferred embodiment disclosed herein provides for a compact construction of the torque testing apparatus, it will be understood that the invention would operate equally well if the torque meter were, for example, rotated 90° relative to the position shown in FIG. 2 in which case the torque scale 36 would always be visible to an operator and there would be no need for window 58.

In the operation of torque testing apparatus 10, a container to be tested is clamped in holding means 32 and cap lever arm 46 is applied to cap 42 in such a way as to extend to one side of center line 52 as shown in the start position in FIG. 2. The cap lever arm 46 and motor lever arm 54 must be sufficiently long to provide some overlap of their free ends so that abutment pin 56 may be placed a sufficient predetermined distance from the axis of output shaft 50 so as to be continually in abutting engagement with the end of cap lever arm 46 throughout the arcuate range of travel of arm 54 required to loosen (or tighten) the cap to the required degree. It will be understood that as output shaft 50 rotates clockwise as seen in FIG. 2, abutment pin 56 will slide along the end cap lever arm 46 moving the latter counterclockwise and with continually increasing force as pin 56 approaches center line 52.

The motor operates at a substantially constant speed (powered by electrical means not shown and under the control of power control means 18) and is sufficiently powerful such that the force being applied by abutment pin 56 to the cap lever arm is substantially constant during the entire procedure. It will be understood by those skilled in the art that in the start position the force applied by the abutment pin to the cap clamp lever arm will have a certain torsional component on the cap, this component being a function of the angle A. This torsional component will gradually increase as the lever arm 46 moves counterclockwise about the cap axis, thus simulating the gradually increasing torque that a user may apply to the cap in removing it. As both lever arms approach center line 52, the torsional component of the force increases to a maximum. Since the force thereafter decreases, the starting point of the levers is chosen so that the cap is sufficiently loosened (or tightened) at or before the maximum is reached.

It will be understood by those skilled in the art that cap clamp lever arm 46 will rotate a predetermined amount relative to cap axis 44 before the cap is loosened. The amount of displacement is obviously dependent upon the amount of removal torque required as well as the rotational speed of the motor. In the preferred embodiment the motor speed is constant and the gear reducer is selected such that the speed of output shaft 50 is approximately 1.2 rpm which has been found to be a good approximation of the speed which an average user may employ. While motor speed is not critical for determining compliance with ASTM specifications, it is desirable that the motor speed approximate manual operation (since torque varies directly with the speed of cap removal).

It will be noted that the preferred embodiment has the requisite repeatability that is inherently lacking in the prior art manual method.

An advantage of the subject invention is that it provides an inexpensive way of consistently conducting torque tests with a device which is relatively simple and, therefore, adaptable to use in a production environment which is otherwise unsuitable for sophisticated automated torque testing devices.

It will be noted that the invention could easily be constructed with the axes of the closure/container and the gear reducer output shaft being in any relative orientation. They need not necessarily be parallel. The only requirement is that the force applied to the cap increase as the lever arm is urged in a rotational direction. Also, while the preferred embodiment utilizes an abutment pin fixedly secured to the motor lever arm, the pin could be placed on the cap lever arm and adapted to slide along the motor lever arm.

It will be understood by those skilled in the art that numerous other modifications and improvements may be made to the preferred embodiment of the invention disclosed herein without departing from the spirit and scope thereof.

What is claimed is:

1. A torque testing apparatus for determining the amount of torque required to axially move a first part of an object relative to a second part thereof, comprising:
   a torque meter;
   mounting means operatively associated with said torque meter for holding said first part of said object;
   a first elongated lever arm adapted to be secured at one end thereof to said second part of said object, said first lever arm and said second part both rotatable in a first rotational direction about a common first axis;
   a second elongated lever arm adapted to be moved relative to said first lever arm, said second lever arm oriented in a plane parallel to that of said first lever arm and rotatable in a second rotational direction about a second axis which is parallel to said first axis;
   motor means operatively connected to one end of said second lever arm to rotate same in said second direction about said second axis;
   an abutment means interposed between the free ends of said first and second lever arms, said abutment means being fixedly secured to one of said free ends and adapted to contiguously slide along the other of said free ends as said second lever arm is rotated in said second direction; and
   means to operate said motor means.

2. An apparatus according to claim 1 wherein said motor means operates at substantially constant speed.

3. An apparatus according to claim 2 wherein said abutment means is fixedly secured to the free end of said second lever arm and slidably contiguous to the free end of said first lever arm as said second lever arm is rotated in said second direction.

4. A torque testing apparatus for determining the amount of torque required to move the threaded closure of a container, comprising:

a torque meter having a mounting means operatively associated therewith for holding said container; and torque applying means connected to said closure for applying to said closure a torque which gradually changes in magnitude until said closure is moved to a predetermined position relative to said container, thereby simulating movement of said closure by hand, said torque applying means comprising:

a first lever arm secured at one end thereof to said closure, said first lever arm and said closure rotatable about a first axis;

a second lever arm adapted to be moved relative to said first lever arm, said second lever arm oriented in a plane parallel to that of said first lever arm and rotatable about a second axis which is parallel to said first axis;

motor means operatively connected to said second lever arm to rotate same about said second axis;

an abutment means interposed between the free ends of said first and second lever arms, said abutment means being fixedly secured to one of said free ends and adapted to contiguously slide along the other of said free ends as said second lever arm is rotated about said second axis; and means to operate said motor means.

5. A torque testing apparatus for determining the amount of torque required to move the threaded closure of a container, comprising:

a torque meter having a mounting means operatively associated therewith for holding said container; and torque applying means connected to said closure for applying to said closure a torque which gradually changes in magnitude until said closure is moved to a predetermined position relative to said container, thereby simulating movement of said closure by hand, said torque applying means comprising:

motor means, the output shaft of which is rotatable about an axis parallel to the axis of said threaded closure;

a first lever arm fixedly secured to said closure;

a second lever arm fixedly secured to said output shaft so as to be rotatable therewith;

force transmitting means interposed between said first and second lever arms to transmit rotational motion of said output shaft to said closure;

means to operate said motor means.

6. A torque testing apparatus for determining the amount of torque required to move the threaded closure of a container, comprising:

a torque meter having a mounting means operatively associated therewith for holding said container; and torque applying means connected to said closure for applying to said closure a removing torque which gradually increased in magnitude until said closure begins to rotate relative to said container, thereby simulating movement of said closure by hand, said torque applying means comprising:

a first lever arm secured at one end thereof to said closure, said first lever arm and said closure rotatable about a first axis;

a second lever arm adapted to be moved relative to said first lever arm, said second lever arm oriented in a plane parallel to that of said first lever arm and rotatable about a second axis which is parallel to said first axis;

motor means operatively connected to said second lever arm to rotate same about said second axis;

an abutment means interposed between the free ends of said first and second lever arms, said abutment means being fixedly secured to one of said free ends and adapted to contiguously slide along the other of said free ends as said second lever arm is rotated about said second axis; and means to operate said motor means.

7. A torque testing apparatus for determining the amount of torque required to remove the threaded closure of a container, comprising:

a torque meter having a mounting means operatively associated therewith for holding said container; and torque applying means connected to said closure for applying to said closure a removing torque which gradually increases in magnitude until said closure begins to rotate relative to said container, thereby simulating movement of said closure by hand, said torque applying means comprising:

motor means, the output shaft of which is rotatable about an axis parallel to the axis of said threaded closure;

a first lever arm fixedly secured to said closure;

a second lever arm fixedly secured to said output shaft so as to be rotatable therewith;

force transmitting means interposed between said first and second lever arms to transmit rotational motion of said output shaft to said closure;

means to operate said motor means.

* * * * *